United States Patent
Nakaho et al.

(10) Patent No.: US 6,556,350 B2
(45) Date of Patent: Apr. 29, 2003

(54) HALF MIRROR

(76) Inventors: Junichi Nakaho, c/o Kabushiki Kaisha Tokai-Rika-Denki-Seisakusho 260, Toyota 3-chome, Ohguchi-cho, Niwa-gun, Aichi-ken (JP); Masao Ayabe, c/o Kabushiki Kaisha Tokai-Rika-Denki-Seisakusho 260, Toyota 3-chome, Ohguchi-cho, Niwa-gun, Aichi-ken (JP); Noriyuki Takai, c/o Kabushiki Kaisha Tokai-Rika-Denki-Seisakusho 260, Toyota 3-chome, Ohguchi-cho, Niwa-gun, Aichi-ken (JP); Hiroshi Yoshida, c/o Kabushiki Kaisha Tokai-Rika-Denki-Seisakusho 260, Toyota 3-chome, Ohguchi-cho, Niwa-gun, Aichi-ken (JP)

( * ) Notice: Subject to any disclaimer, the term of this patent is extended or adjusted under 35 U.S.C. 154(b) by 15 days.

(21) Appl. No.: 09/968,707

(22) Filed: Oct. 2, 2001

(65) Prior Publication Data

US 2002/0039243 A1 Apr. 4, 2002

(30) Foreign Application Priority Data

Oct. 3, 2000 (JP) ........................................ 2000-303999

(51) Int. Cl.$^7$ ........................... G02B 27/14; G02B 1/10; G02B 5/28; G02B 5/08; G02F 1/153
(52) U.S. Cl. ........................ 359/634; 359/583; 359/584; 359/589; 359/839; 359/267
(58) Field of Search ............................... 359/634, 515, 359/549, 550, 601, 602, 603, 604, 608, 609, 618, 583, 589, 722, 267, 584, 839; 348/834, 842, 742

(56) References Cited

U.S. PATENT DOCUMENTS

| | | | | |
|---|---|---|---|---|
| 4,805,989 A | * | 2/1989 | Nakajima | 359/584 |
| 4,906,085 A | * | 3/1990 | Sugihara et al. | 359/839 |
| 4,921,331 A | * | 5/1990 | Nakajima | 359/584 |
| 4,979,802 A | * | 12/1990 | Ichikawa | 359/584 |
| 5,007,710 A | * | 4/1991 | Nakajima et al. | 359/589 |
| 5,528,422 A | * | 6/1996 | Roberts | 359/583 |
| 6,292,302 B1 | * | 9/2001 | Krisko et al. | 359/634 |
| 6,356,376 B1 | * | 3/2002 | Tonar et al. | 359/267 |

FOREIGN PATENT DOCUMENTS

| | | |
|---|---|---|
| JP | 2-121604 | 5/1990 |
| JP | 6-281802 | 10/1994 |

* cited by examiner

Primary Examiner—Evelyn A Lester
Assistant Examiner—Jack Dinh
(74) Attorney, Agent, or Firm—Nixon Peabody LLP; Thomas W. Cole

(57) ABSTRACT

The present invention relates to a half mirror which transmits light from the back of a mirror body. The half mirror comprises a substrate that at least transmits light having predetermined wavelengths; a reflecting film, comprising substantially silicon of a thickness of 20 to 45 nm and being integrally formed on a surface of the substrate, for reflecting light that is made incident upon the reflecting film from the substrate side thereof and transmitting, toward the substrate side of the reflecting film at a fixed ratio, light made incident upon the reflecting film from the side opposite to the substrate side; and a protective film, which is made of a translucent material that at least transmits light having particular wavelengths, formed on the surface of the reflecting film opposite to the surface on which the substrate is formed.

17 Claims, 8 Drawing Sheets

F I G. 3
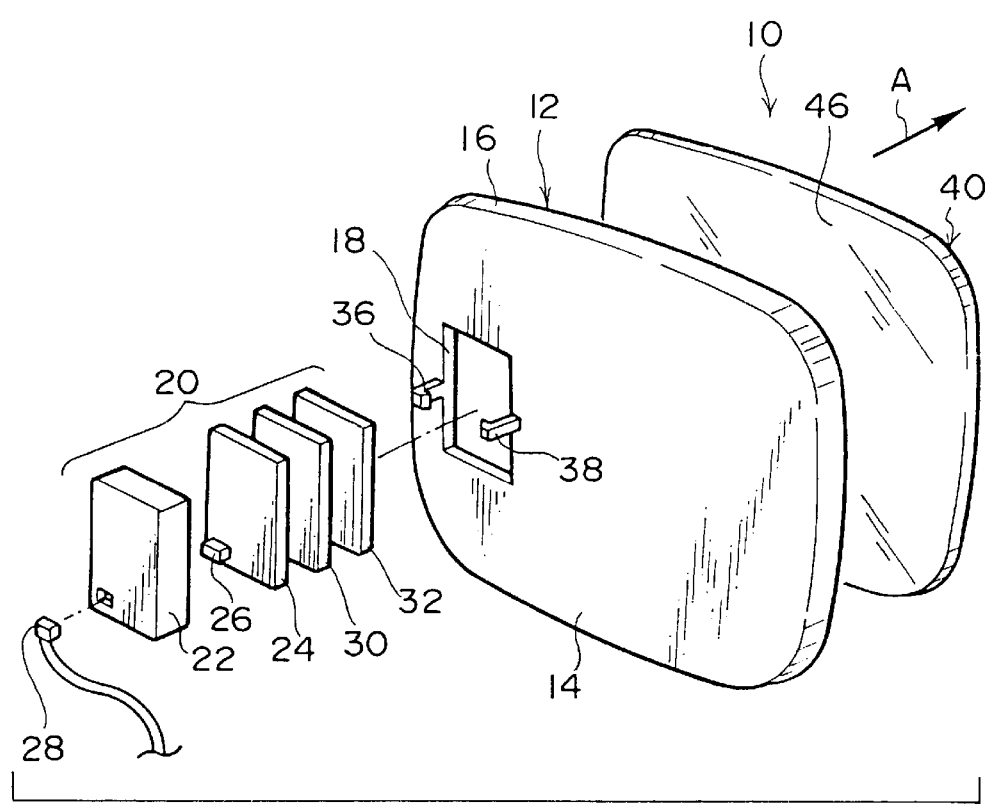

HALF MIRROR

BACKGROUND OF THE INVENTION

1. Field of the Invention

The present invention relates to a half mirror which transmits light from the back of a mirror body and which is used as rearview mirrors provided at the interior and the exterior of a vehicle.

2. Description of the Related Art

Usually, rearview mirrors are provided at the interior and the exterior of a vehicle compartment. A mirror of this type includes a mirror body. The mirror body includes a plate-configured glass substrate, on which a metal reflecting film is formed. The glass substrate is secured to a mirror holder and is housed in a case, such as a visor.

The mirror holder is formed in a dish-shape, that opens at one end in the depth direction thereof. The mirror body is housed within the mirror holder such that the reflecting film on the glass substrate faces the opening end of the mirror holder. The case, such as a visor, is formed in a dish-shape or a bowl-shape. The mirror holder is housed within the case with the opening end thereof facing the opening end of the case. The mirror holder is fixed at a predetermined position of a vehicle via the casing.

Recently, these inner and outer rearview mirrors have been studied for use not only for providing a rearview of a vehicle but also as a kind of indicator, for example, as a direction indicator when the vehicle turns, or as a speed indicator.

When a mirror is also used as an indicator, a mirror known as a "half mirror," which transmits light from the back of the reflecting film (i.e., from the glass substrate side thereof), is used as a mirror body. In such a mirror, indicating devices like a turn signal, a character display panel for indicating speed, or the like are disposed at the back of the glass substrate (i.e., on the side of the glass substrate opposite to the side where the reflecting film is formed). When the indicating device lights up, characters and marks are transmitted through the glass substrate and the reflecting film so as to enable an occupant of the vehicle or an occupant of another vehicle approaching from behind (i.e., one who observes the mirror from the opening side of the mirror holder) to observe these characters and marks.

The structure of a mirror body 122 used in an aforementioned half mirror 120 for a vehicle is schematically shown in a cross-sectional view in FIG. 8. As shown in FIG. 8, a silicon (Si) thin film having a thickness T4 of about 20 nm is usually used as a reflecting film 126 provided on a surface of a glass substrate 124 which is a component of a mirror body 122. A protective film 128 is provided at the front of the reflecting film 126. The protective film 128 consists of a silicon dioxide ($SiO_2$) film 130 having the thickness T5 of about 20 nm, which is formed on the reflecting film 126, and a titanium dioxide ($TiO_2$) film 132 having the thickness T6 of about 15 nm, which is formed on the silicon dioxide film 130. The protective film 128 prevents the reflecting film 126 from deterioration, damage that may otherwise be caused to the reflecting film 126 when the mirror body 122 is mounted on the mirror holder or when the above-described indicating device (not shown) is mounted at the back of the mirror body 122, and the like.

Accordingly, three thin films, namely, the reflecting film 126 and the two protective films 128, are provided on the glass substrate 124 of the aforementioned mirror body 122.

In the above-described mirror body 122, the overall reflectance of the mirror body 122 is significantly affected by even slight variations in the thickness of each thin film, namely, the reflecting film 126, the silicon dioxide film 130, and the titanium dioxide film 132. Accordingly, to ensure the reflectance of a predetermined standard, the accuracy in providing a particular film thickness for the reflecting film 126, the silicon dioxide film 130, and the titanium dioxide film 132 respectively, must be strictly controlled. However, because such rigorous control of accuracy in film thickness is extremely difficult, it has become a major reason for increased manufacturing costs.

SUMMARY OF THE INVENTION

In view of the aforementioned facts, it is an object of the present invention to provide a half mirror which includes a protective film, for protecting a reflecting film and which has stable quality and does not require any strict quality (film thickness) control, thereby resulting in lower manufacturing costs.

A half mirror relating to a first aspect of the present invention comprises a substrate that at least transmits light having predetermined wavelengths; a reflecting film, comprising substantially silicon of a thickness of 20 to 45 nm and being integrally formed on a surface of the substrate, for reflecting light that is made incident upon the reflecting film from the substrate side thereof and transmitting, toward the substrate side of the reflecting film at a fixed ratio, light made incident upon the reflecting film from the side opposite to the substrate side; and a protective film, which is made of a translucent material that at least transmits light having particular wavelengths, formed on the surface of the reflecting film opposite to the surface on which the substrate is formed.

According to the thus structured half mirror, the light that is made incident upon the reflecting film from the side of the substrate opposite to the surface where the reflecting film is formed (hereinafter, referred to as the front of the substrate) is reflected by the reflecting film. On the other hand, the light that is made incident upon the reflecting film from the side of the protective film opposite to the surface where the reflecting film is formed (hereinafter, referred to as the back of the protective film) is transmitted through the reflecting film, and then passes through the substrate. Accordingly, the light that is made incident upon the reflecting film from the front of the substrate and is reflected at the reflecting film, and the light that is made incident upon the reflecting film from the back of the protective film, can both be observed from the substrate side of the mirror.

In the half mirror, the reflecting film is formed at the back of the substrate. Accordingly, by accommodating the substrate in, for example, a housing (casing) such as a mirror holder having a base, the reflecting film can be protected against any foreign substances which may otherwise contact or attach to the reflecting film. In addition, a protective layer made of a translucent material is formed on the reflecting film. This structure makes it impossible for any foreign substances to directly contact the reflecting film when, for example, the reflecting film is accommodated in aforementioned housing or the like. Accordingly, the reflecting film can be protected from deterioration or damages that may be caused thereto.

In the half mirror of the present invention, because the reflecting film is provided at the back of the substrate and the protective film is provided at the back of the reflecting film, light is made incident upon the reflecting film from the substrate side thereof is basically not affected by the protective film. Accordingly, so long as the thickness of the reflecting film is accurate, even if there is any inaccuracy with respect to the thickness of the protective film, the reflectance of the light, that is made incident upon the reflecting film from the substrate side thereof and is reflected by the reflecting film, is not affected. As a result, a predetermined reflectance can be ensured. As described above, the protective film can be produced with less rigorous thickness control, thereby reducing the manufacturing costs.

Note that, in the present invention, it suffices that the substrate and the protective film can at least transmit light having predetermined wavelengths. That is, the substrate and the protective film may be transparent and transmit light having any wavelengths, or, alternatively, they may transmit or restrict only the light having particular wavelengths.

Further, it is preferable that the half mirror of the present invention further includes a light source which emits light of predetermined wavelengths, the light being transmittable through the protective film and the reflecting film, and the light source being provided at a side of the protective film opposite to the side at which the reflecting film is provided.

In the half mirror having the above structure, a light source, which emits light of predetermined wavelengths, is provided at the back side of the protective film. The light emitted from the light source is transmitted through the protective film and the reflecting film. The light emitted from the light source can therefore be observed from the front of the substrate.

In the present half mirror, the light source is disposed at the back side of the protective film. Since the protective film is interposed between the reflecting film and the light source, the light source cannot contact the reflecting film though it may contact the protective film. Accordingly, when the half mirror is assembled, the light source does not cause any damage to the reflecting film, thus preventing deterioration of the reflecting film.

In addition, it is preferable that the half mirror of the present invention further includes a heating device at a side of the protective film opposite to the side at which the reflecting film is provided.

In the half mirror having the above structure, a heating device is provided at the back side of the protective film. When the heat generated by the heating device is transmitted to the substrate via the protective film and the reflecting film, and the substrate is heated, water droplet or the like attaching to the surface of the substrate, i.e., the surface of the substrate opposite to the surface on which the reflecting film is formed, evaporates. The surface of the substrate can therefore be defogged, thereby ensuring good visibility.

In the present half mirror, the heating device is disposed at the back side of the protective film. Since the protective film is interposed between the reflecting film and the heating device, the heating device cannot contact the reflecting film though it may contact the protective film. Accordingly, when the half mirror is assembled, the heat source does not cause any damage to the reflecting film, thus preventing deterioration of the reflecting film.

A method for manufacturing a half mirror relating to a second aspect of the present invention comprises the steps of; a) forming a reflecting film comprising substantially silicon of a thickness of 20 to 45 nm and disposing said reflecting film integrally on a surface of the substrate, for reflecting light that is made incident upon the reflecting film from the substrate side thereof and transmitting, toward the substrate side of the reflecting film at a fixed ratio, light made incident upon the reflecting film from the side opposite to the substrate side; and b) forming a protective film, which is made of a translucent material that at least transmit light having particular wavelengths and is formed on the surface of the reflecting film opposite to the surface on which the substrate is formed.

It is preferable that the method for manufacturing a half mirror further includes a step of forming a primary protective film that comprises substantially silicon dioxide and interposed between the reflecting film and the protective film, the forming step is being carried out directly after the forming step of the reflecting film.

In the method for manufacturing a half mirror, it is preferable that the step of forming the primary protective film is substantially the same as the process of forming the reflecting film.

According to the half mirror obtained in the above method, a primary protective film, made substantially of silicon dioxide, is interposed between the protective film and the reflecting film. The primary protective film can be obtained in a manufacturing process which is substantially the same as that of the reflecting film, directly after the reflecting film is formed. That is, the primary protective film can be made without moving the substrate after the reflecting film is formed on the substrate. As described above, the protective film is formed after the primary protective film is formed. Even if any foreign substances or the like should come in contact with the substrate when the substrate is transported from a device for making the primary protective film to a device for making the protective film, the reflecting film is protected by the primary protective film against these foreign substances which may otherwise directly contact the reflecting film.

BRIEF DESCRIPTION OF THE DRAWINGS

FIG. 3 is an exploded perspective view of the half mirror relating to the first embodiment of the present invention, shown from a different direction than FIG. 2.

DESCRIPTION OF THE PREFERRED EMBODIMENTS

Figure 1:
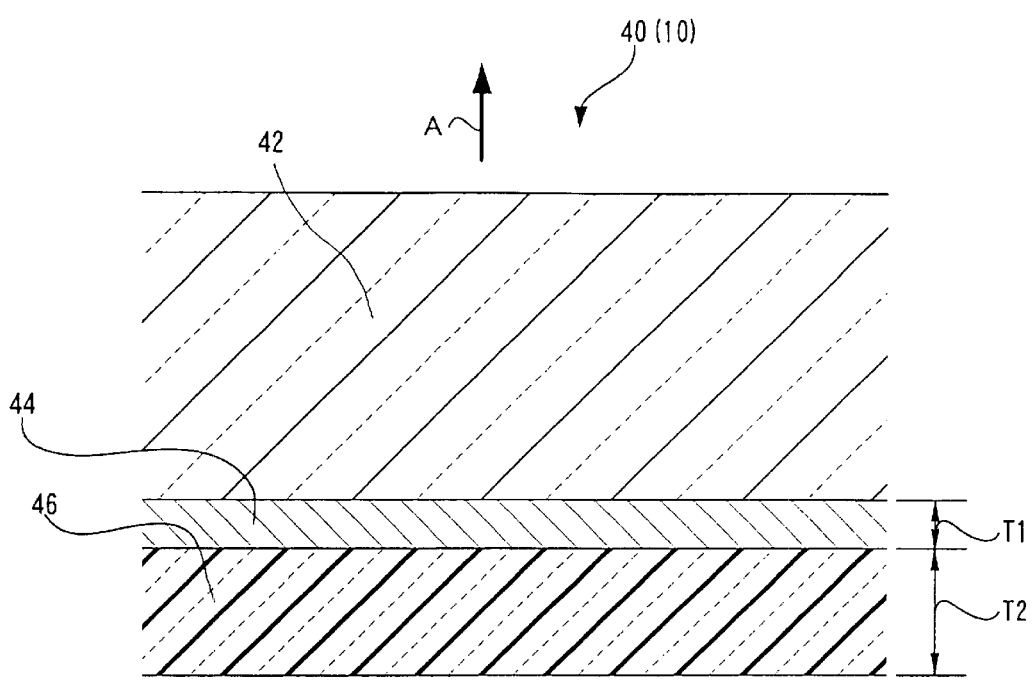
FIG. 1 is a cross-sectional view schematically showing a structure of a mirror body of a half mirror relating to a first embodiment of the present invention.

Three embodiments of the present invention will be described in detail hereinafter. Basically similar components are designated by the same reference numerals.

Structure of First Embodiment

Figure 2:
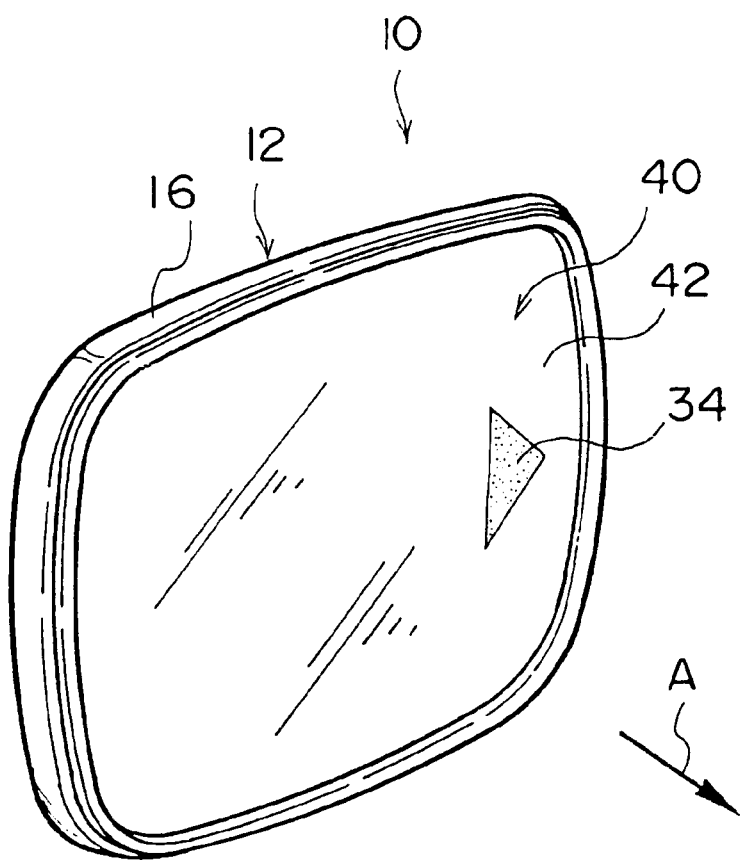
FIG. 2 is a perspective view of the half mirror relating to the first embodiment of the present invention.

A half mirror 10 for a vehicle relating to a first embodiment of the present invention is shown in a perspective view in FIG. 2. The structure of the half mirror 10 is shown in an exploded perspective view seen from a different direction than FIG. 2 is shown in FIG. 3. The arrow A indicates substantially the same direction in all the figures.

The half mirror 10 includes a mirror holder 12 as shown in FIG. 3. The mirror holder 12 comprises a plate-shaped bottom portion 14 and a circular edge portion 16 which is provided along an outer peripheral portion of the bottom portion 14. Overall shape of the mirror holder 12 is that of a box or a dish having a shallow base.

An opening 18 having a predetermined shape is provided in the bottom portion 14 of the mirror holder 12. Although the opening 18 is formed in a substantial rectangular-shape in the present embodiment, the shape of the opening 18 is not limited to the same. The opening 18 penetrates the bottom portion 14, and a light emitting unit 20, serving as a light source, is fit in the opening 18.

The light emitting unit 20 includes a casing 22. The casing 22 is fit in the opening 18 with the opening thereof facing the opening end of the mirror holder 12. The casing 22 is formed in a substantial box-shape, and the dimension thereof along the thickness direction of the mirror body 12 is larger than the thickness of the mirror body 12. A PC substrate 24, including a substantially triangular-shaped light emitter, is accommodated within the casing 22. The PC substrate 24 includes a connector 26, which can be mechanically and electrically connected to a wire harness 28 via an opening provided in a bottom portion of the casing 22. The wire harness 28 is electrically connected to a turn signal indicator switch, battery, and the like (not shown) each provided at a predetermined location in a vehicle in order to supply electricity to the PC substrate 24 when energized.

A diffusing plate 30 is provided further toward the opening of the casing 22 than the PC substrate 24. The light emitted from the light emitter of the PC substrate 24 is diffused when the light is transmitted through the diffusing plate 30. Further, a light control filter 32 is provided further toward the opening of the casing 22 than the diffusing plate 30. After transmitted through the diffusing plate 30, the light is transmitted through the light control filter 32, where the light is shaped so as to correspond to the shape of the light emitter. As a result, a turn signal 34 having a substantial triangular-shape as shown in FIG. 2 lights up. The light control filter 32 transmits light such that the transmitted light can be observed from only a predetermined direction. In the present embodiment, the occupant of the vehicle cannot observe the light which is transmitted through the light control filter 32. However, the occupant of another vehicle which is behind the vehicle equipped with the mirror of the present invention can observe the light which is transmitted through the light control filter 32.

The light emitting unit 20 having the above-described structure is fit in the opening 18. In this state, the end portion of the light emitting unit 20, at the side toward the opening of the mirror holder 12, is basically on the same plane as the inner bottom surface of the bottom portion 14, i.e., on the same plane as the inner surface of the mirror holder 12.

As shown in FIG. 3, a pair of holding claws 36, 38 are provided at the outer surface of the bottom portion 14. The holding claw 36 is disposed at one of the four edges of the above-described opening 18 so as to protrude toward the light emitting unit 20. The holding claw 38 is disposed at the edge opposing the edge at which the holding claw 36 is provided, and also protrudes toward the light emitting unit 20. When the light emitting unit 20 is fit in the opening 18, these holding claws 36 and 38 prevent the light emitting unit 20 from moving away in the direction opposite to the opening end of the mirror holder 12, i.e., the direction opposite to the direction of arrow A.

As shown in FIGS. 2 and 3, the half mirror 10 also includes a mirror body 40. The mirror body 40 is formed in a substantial plate-shape, and is disposed with the thickness direction thereof along the depth direction of the mirror holder 12. The outer peripheral shape of the mirror body 40 is formed in a shape similar to and a little smaller than that of the inner peripheral shape of the edge portion 16 of the mirror holder 12. The mirror body 40 is held and secured within the mirror holder 12 using a fixing member such as an adhesive, or a fastening member such as screws, or, alternatively, an engaging-holding member such as engaging claws, engaging grooves, or the like which are provided inside the mirror holder 12.

The structure of the mirror body 40 is schematically illustrated in a cross-sectional view in FIG. 1. As shown in FIG. 1, the mirror body 40 includes a glass substrate 42 as a substrate. The glass substrate 42 is formed as a plate and is made of a glass material which is transparent or colored in order for absorbing or transmitting light having particular wavelengths.

A reflecting film 44 is provided at the back of the glass substrate 42 (i.e., on the surface facing the bottom portion 14 when the mirror body 40 is fit in the mirror holder 12). The reflecting film 44 is a silicon film made substantially of silicon (Si). The thickness Ti of the reflecting film 44 is set to be about 30 nm (30±5 nm). The reflecting film 44 is integrally formed at the back of the glass substrate 42 by vapor deposition or the like. As described in detail later, if the reflecting film 44 is made of a silicon film having the thickness described above, a predetermined ratio of the light that is made incident upon the reflecting film 44 from the back of the reflecting film 44 (i.e., from the surface of the reflecting film 44 opposite to the surface where it contacts the glass substrate 42) is transmitted through the reflecting film 44.

Although, in the present embodiment, the thickness T1 of the reflecting film 44 is set to be about 30 nm (30±5 nm), the thickness T1 of the reflecting film 44 may be in a range of 20 to 45 nm. The reason for this will be explained later.

As shown in FIG. 1, a transparent coating film 46, serving as a protective film, is provided at the back of the reflecting film 44. The coating film 46 is made of transparent synthetic resin material such as acrylic, or transparent coating material. The thickness T2 of the coating film 46 is set to be about 1 µm. Note that, it suffices that the thickness T2 of the coating film 46 is greater than or equal to 1 µm.

Next, action and effect of the present embodiment will be described.

In the half mirror 10, the light, which comes from the opening end side of the mirror holder 12 toward the mirror body 40, is transmitted through the glass substrate 42 and is reflected at the reflecting film 44, and then is transmitted through the glass substrate 42 again. Accordingly, by viewing the present half mirror 10 when the opening end of the mirror holder 12 faces the substantially rear direction of the vehicle, the viewer can observe the rear of the vehicle in the same manner as a general mirror.

When a turn signal indicator switch which is provided, for example, in the vicinity of the steering wheel in the vehicle compartment is turned on, the PC substrate 24 of the light emitting unit 20 is electrically charged via a wire harness 28. When the PC substrate 24 is supplied with electricity, the light emitter provided at the PC substrate 24 emits light, and the emitted light passes through the diffusing plate 30. As described above, the light is diffused as it transmitted through the diffusing plate 30, and the diffused light then is transmitted through the light control filter 32. As a result, the aforementioned substantially triangular-shaped turn signal 34 lights up or flashes.

Then, the turn signal 34, which is flashing or lit up, (more precisely, the light which comprises the turn signal 34) is transmitted through the transparent coating film 46 which is a component of the mirror body 40, and, thereafter, is made incident upon the reflecting film 44 from the back of the reflecting film 44. As described above, because a predetermined ratio of the light that is made incident upon the reflecting film 44 from the back of the reflecting film 44, is transmitted through the reflecting film 44. Thus, a part of the turn signal 34 is transmitted through the reflecting film 44 and then through the glass substrate 42.

As a result, the turn signal 34, which is flashing or lit, appears to be projected at the mirror body 40 and the occupant of the vehicle which is behind can observe the turn signal 34 from the opening end side of the mirror holder 12.

In the half mirror 10, since the reflecting film 44 is provided at the back of the glass substrate 42 as described above, when the mirror body 40 is fit in the mirror holder 12, the front surface of the reflecting film 44, i.e., the surface facing toward the opening end of the mirror holder 12, can therefore be protected against any foreign substances which may otherwise contact or attach to the reflecting film. Accordingly, this structure delays or prevents deterioration of the reflecting film 44 caused by damage or by particles of moisture, oil, smoke, or the like being attached to the reflecting film 44.

Further, when the mirror body 40 is fit in the mirror holder 12, the bottom portion 14 of the mirror holder 12 basically protects the back surface of the reflecting film 44. Therefore, in a state in which the mirror body 40 is fit in the mirror holder 12, foreign substances cannot attach to the back surface of the reflecting film 44. Accordingly, this structure also delays or prevents deterioration of the reflecting film 44 caused by damage or by particles of moisture, oil, smoke, or the like being attached to the reflecting film 44.

In addition, in the half mirror 10, the transparent coating film 46 is formed at the back of the reflecting film 44. The coating film 46 also protects the back surface of the reflecting film 44 in order to delay or prevent deterioration of the reflecting film 44 caused by damage or by particles of moisture, oil, smoke, or the like being attached to the reflecting film 44.

In the half mirror 10, the light emitting unit 20 is fit in the bottom portion 14 of the mirror holder 12. If there are some errors with respect to the dimensions of the light emitting unit 20 or holding claws 36 or 38, or some assembling errors when the light emitting unit 20 is fit in the opening 18, it is possible that the light emitting unit 20 contacts the back surface of the mirror body 40.

However, in the half mirror 10, since the transparent coating film 46 is provided at the back of the reflecting film 44 as described above, the back surface of the reflecting film 44 is protected by the transparent coating film 46. With this structure, if the light emitting unit 20 contacts the back of the mirror body 40, the transparent coating film 46 protects the reflecting film 44 against damage.

In a conventional half mirror 120, the silicon dioxide film 130 and the titanium dioxide film 132 (see FIG. 8) constitute a protective film 128. Because the thickness of the silicon dioxide film 130 and the titanium dioxide film 132 respectively is 15 nm or 20 nm, an extremely rigorous control, i.e., a control in the order of nanometer, in film thickness has been required in the conventional half mirror 120.

However, the thickness of the transparent coating film 46 of the present embodiment is basically greater than or equal to 1 $\mu$m, and thus much greater than the thickness of the silicon dioxide film 130 and the titanium dioxide film 132 (see FIG. 8) constituting the conventional protective film 128 of a reflecting film 126 of a conventional half mirror 120. Accordingly, in the present embodiment, transmittance and reflectance over a predetermined value can be obtained with significantly less rigorous control of film thickness than the case of the reflecting film 44 described above, the silicon dioxide film, or the titanium dioxide film of the conventional protective film. Therefore, in the half mirror 10, since the thickness control of the transparent coating film 46 for protecting the reflecting film 44 can be made less rigorous, the half mirror 10 of stable quality can be produced with lower manufacturing costs.

Figure 4:
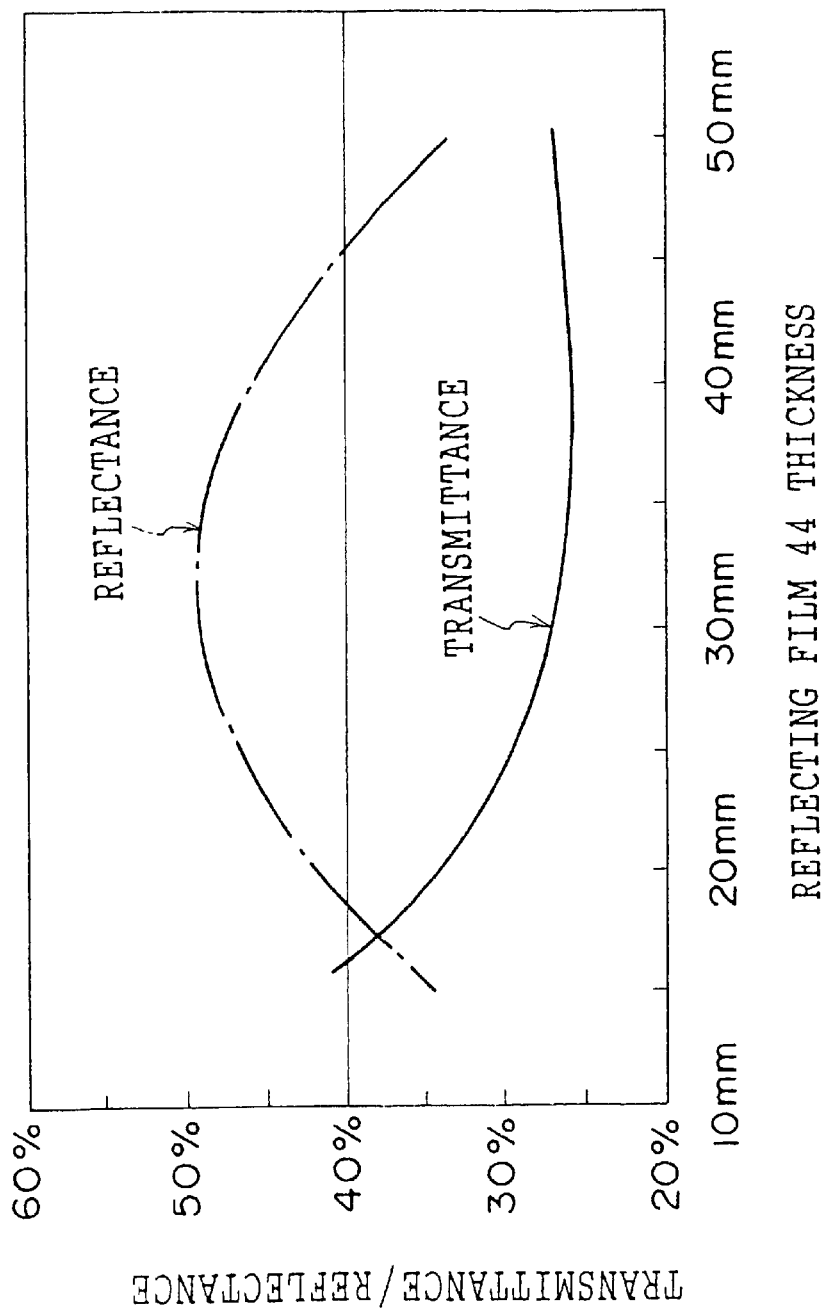
FIG. 4 is a graph showing the variation of reflectance and transmittance as a function of reflecting film thickness, in which transmittance is shown by the continuous line and reflectance is shown by the one-dot-chain line.
Figure 8:
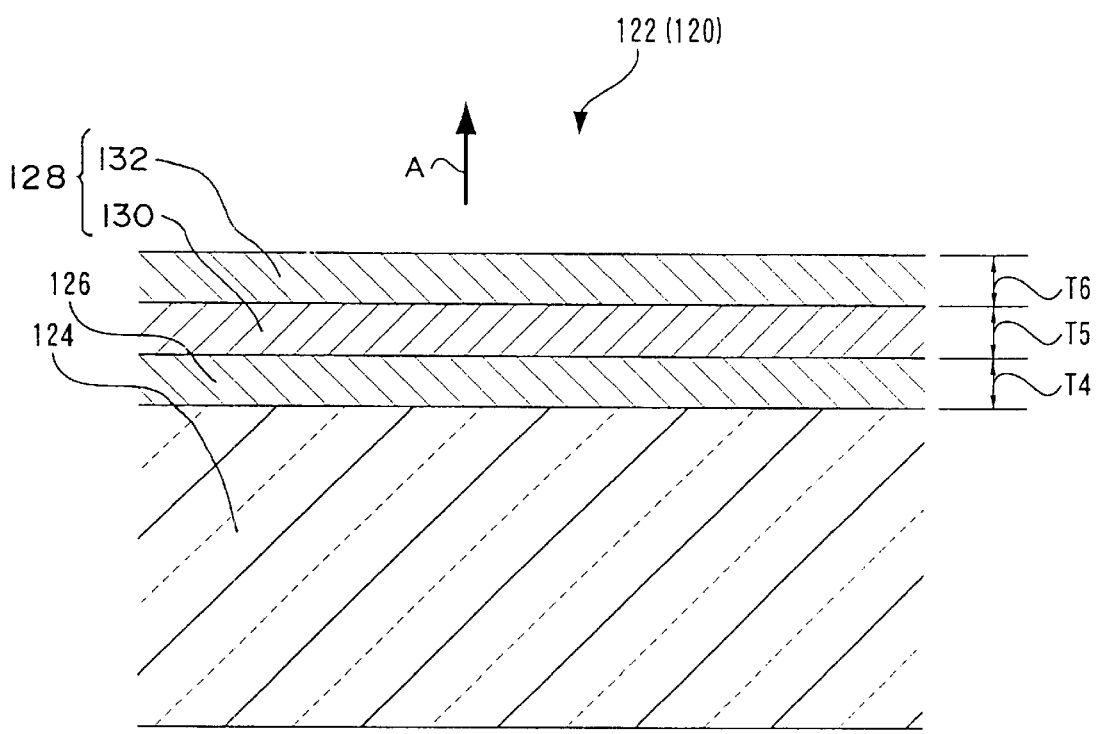
FIG. 8 is a cross-sectional view showing a structure of a mirror body of a conventional half mirror.

In addition, in the half mirror 120 shown in FIG. 8, since the thickness of the reflecting film 126, the silicon dioxide film 130, and the titanium dioxide film 132 are all affected by each other, desired reflectance and transmittance cannot be obtained unless the thickness of each film is strictly controlled. However, in the half mirror 10 of the present embodiment, because it is at the back of the reflecting film 44 that the transparent coating film 46 is provided, accuracy in the thickness of the transparent coating film 46 can be less strictly controlled. Further, as shown in FIG. 4, if the thickness T1 of the reflecting film 44, which requires stricter control than the transparent coating film 46, is in the range of 20 to 45 nm, a reflectance of greater than or equal to 40 percent can be obtained, while simultaneously achieving greater than or equal to 20 percent transmittance.

Figure 5:
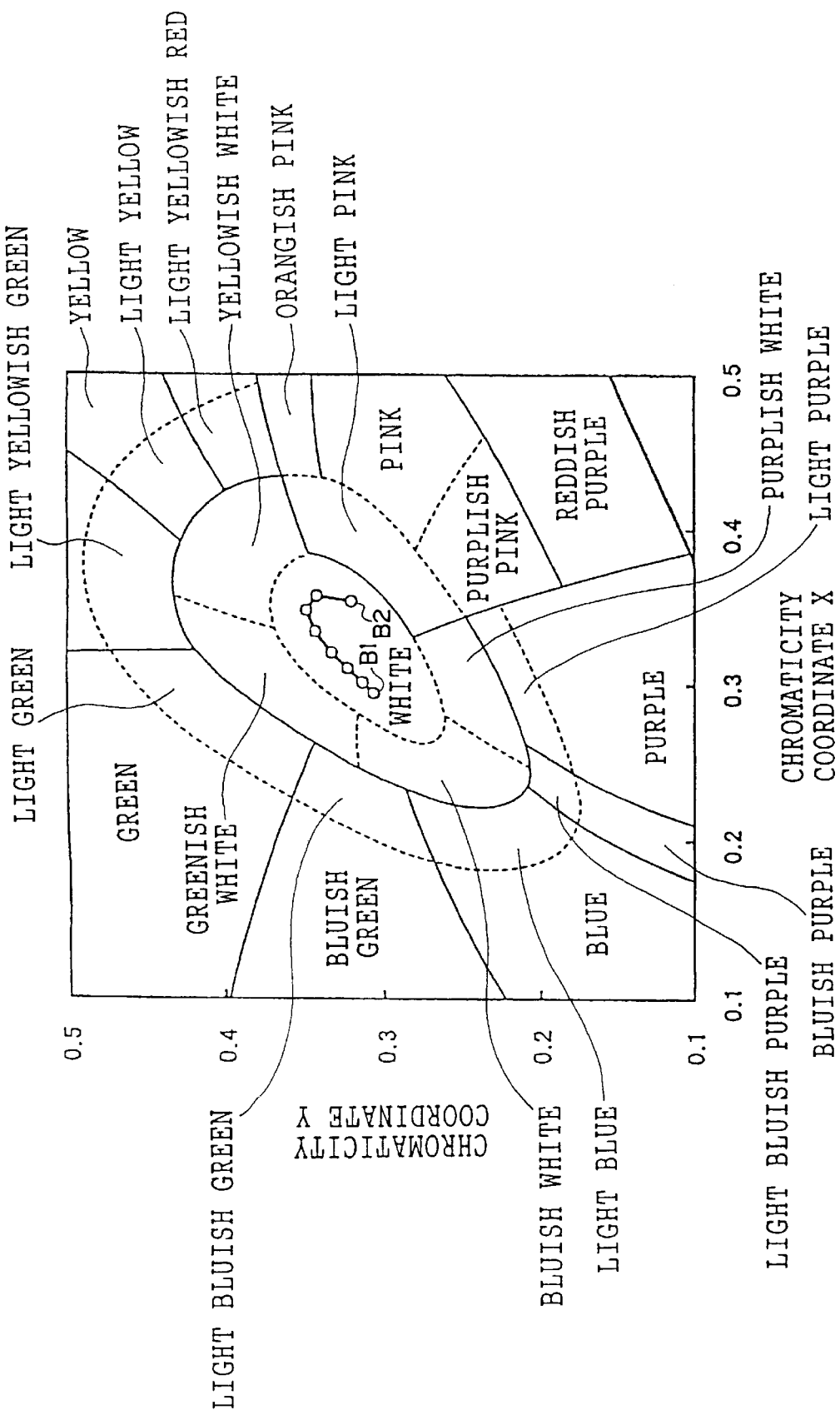
FIG. 5 is a diagram showing a chromaticity coordinate as a function of reflecting film thickness.

Characteristics of reflected light, when white light of predetermined wavelengths enters the mirror body 40 having the reflecting film 44, is illustrated in a chromaticity coordinate as a function of reflecting film thickness T1 ranging between 15 nm (B1 point) to 50 nm (B2 point) in FIG. 5. Note that, the chromaticity coordinate x and the chromaticity coordinate y were calculated according to Japanese Industrial Standard, JIS Z8701 "Color representation according to XYZ color system and X10Y10Z10 color system" on the basis of the revised Munsell color system, and detailed explanation of the calculations are omitted.

As shown in FIG. 5, the color of the reflected light, which is the white light of predetermined wavelengths that is made incident upon the reflecting film of the mirror body 40 of the half mirror 10, remains white when the thickness T1 of the reflecting film 44 is in a range of 15 nm (B1 point) to 50 nm (B2 point). Accordingly, when a viewer looks at the half mirror 10 to observe the rear field of view of the vehicle, the mirror body 40 is basically not colored.

Second Embodiment

Next, a second embodiment of the present invention will be described.

Figure 6:
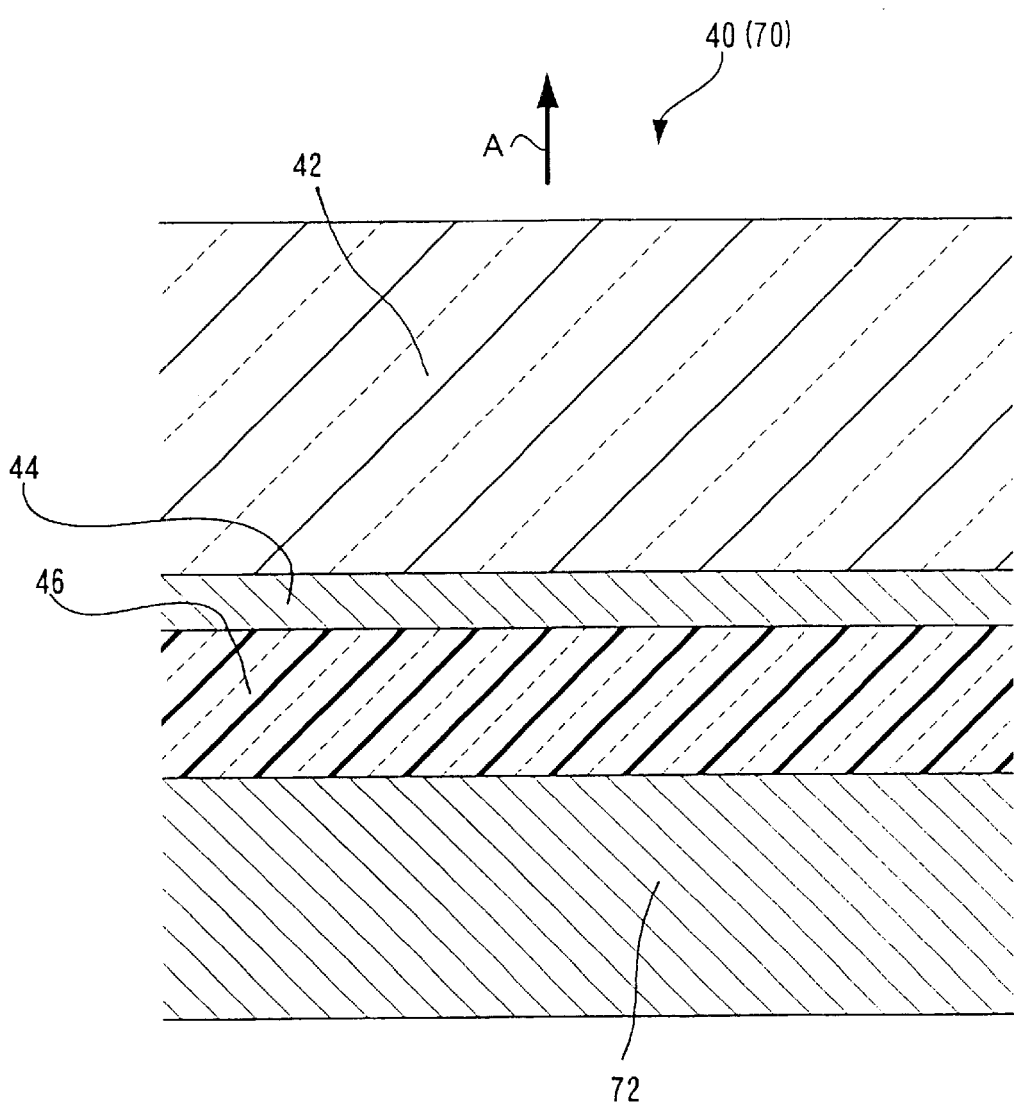
FIG. 6 is a cross-sectional view schematically showing a structure of a mirror body of a half mirror relating to a second embodiment of the present invention.

A cross-sectional view of the structure of a half mirror 70 relating to the second embodiment of the present invention is schematically illustrated in FIG. 6. As shown in FIG. 6, the half mirror 70 includes a sheet-configured heater 72, which serves as a heating device, in addition to the above-described light emitting unit 20. The heater 72 is electrically connected to a control device or a battery provided at a predetermined position in a vehicle, or to a heater switch provided in a vehicle compartment via an electrical connector, which is an equivalent of the wire harness 28 that supplies electricity to the PC substrate 24 in the above first embodiment. The heater 72 is a kind of resistor that generates resistance heat when energized.

The heater 72 is housed within the mirror holder 12, at the back side of the mirror body 40, or is fit in an opening formed in the bottom portion 14 of the mirror holder 12 in the same manner as the light emitting unit 20 in the first embodiment. The heater 72 generates heat and then transmits the heat to the mirror body 40, thereby evaporating moisture on the surface of the mirror body 40 so as to defog the mirror body 40.

Note that, in the present embodiment, since the heater 72 is disposed at the back of the mirror body 40, it is highly likely, or may even be inevitable, that the heater 72 contacts the back surface of the mirror body 40 when the half mirror 70 is assembled. However, because the transparent coating film 46 is provided at the back of the reflecting film 44, even if the heater 72 contacts the mirror body, the coating film 46 protects the reflecting film 44 against any damage which may otherwise be caused to the reflecting film 44.

The light emitting unit 20 is disposed at the back of the mirror body 40 in the first embodiment, and the heater 72 is disposed at the back of the mirror body 40 in the second embodiment. However, the transparent coating film 46 formed on the reflecting film 44 can protect the reflecting film 44 against any damage even if some kind of member is provided at the back of the mirror body 40 and if the member contacts the mirror body 40 when the half mirror is assembled. Accordingly, basically any kind of member can be disposed at the back of the mirror body 40.

In case of breakage of the mirror body 40, a scatter-preventing member such as, for example, a shatter-resistant sheet for holding fragments of the mirror body 40 or an adhesive tape having the same effect as the aforementioned sheet may be provided at the back of the mirror body 40 except in an area facing the above-described light emitting unit 20. In this case, the transparent coating film 46 also protects the mirror body 40 against any damage which may occur when the scatter-preventing member is assembled. In addition, if such a scatter-preventing member is used, adhesives or the like which the scatter-preventing member includes can be prevented from directly attaching to the reflecting film 44. Accordingly, in this case also, deterioration of the reflecting film 44 can be prevented or delayed.

In the present embodiment, it may be preferable for a transparent and heat-resisting synthetic resin or coating material to be used as the transparent coating film 46 depending on the temperature of the heat generated by the heater 72, which is disposed at the back of the mirror body 40.

Third Embodiment

Next, a third embodiment of the present invention will be described.

Figure 7:
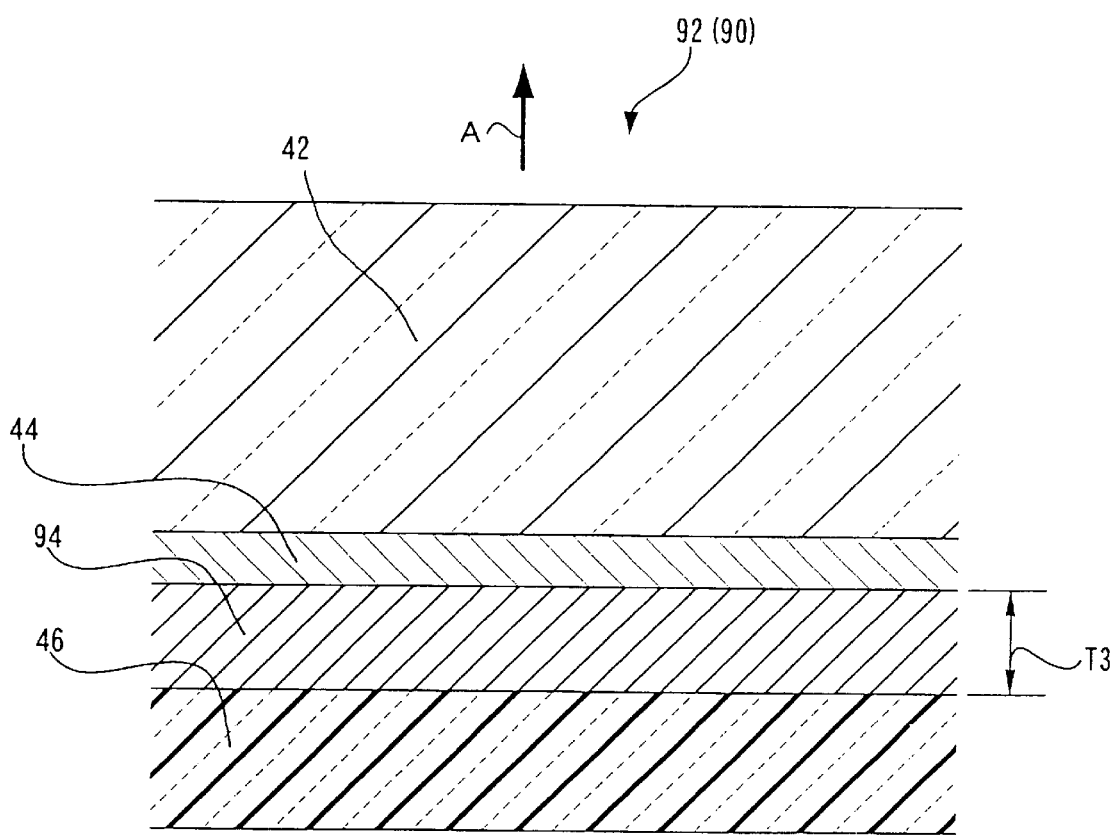
FIG. 7 is a cross-sectional view schematically showing a structure of a mirror body of a half mirror relating to a third embodiment of the present invention.

A cross-sectional view of the structure of a mirror body 92 of a half mirror 90 relating to the present embodiment is schematically illustrated in FIG. 7. As shown in FIG. 7, in the mirror body 92 of the half mirror 90, a silicon dioxide film 94 which is a primary protective film is interposed between the reflecting film 44 and the transparent coating film 46.

The silicon dioxide film 94 is made substantially of silicon dioxide ($SiO_2$) and the thickness T3 thereof is set to be about 200 nm (more precisely, 200±20 nm). The silicon dioxide film 94 is formed on the glass substrate 42 by the same film-making device (such as vapor deposition device) as that used in forming the reflecting film 44. The film-making procedure is as follows: the glass substrate 42 is placed in the film-making device, the reflecting film 44 is formed first, and then the silicon dioxide film 94 is formed thereon.

Accordingly, the reflecting film 44 is protected by the silicon dioxide film 94 until the transparent coating film 46 is formed. That is, for example, when the partly finished mirror body 92 in which the silicon dioxide film 94 is formed is transported from the film-making device of the reflecting film 44 and the silicon dioxide film 94 to the film-making device of the transparent coating film 46, the reflecting film 44 can be protected against any foreign substances which may otherwise attach to or contact the reflecting film 44. As a result, any damage or the like to the reflecting film 44 during the aforementioned transportation can be prevented.

As described above, in the present invention, a protective film for protecting the reflecting film, of stable quality can be produced without rigorous control of the protective film thickness, thereby resulting in lower manufacturing costs.

What is claimed is:

1. A half mirror comprising:

a substrate that at least transmits light having predetermined wavelengths;

a reflecting film, comprising substantially silicon of a thickness of 20 to 45 nm and being integrally formed on a surface of said substrate, for reflecting light that is made incident upon the reflecting film from the substrate side thereof and transmitting, toward said substrate side of the reflecting film at a fixed ratio, light made incident upon the reflecting film from the side opposite to the substrate side; and a protective film, which is made of a translucent material that at least transmits light having particular wavelengths, formed on the surface of said reflecting film opposite to the surface on which said substrate is formed.

2. The half mirror according to claim 1, wherein the thickness of said protective film is greater than or equal to 1 $\mu$m.

3. The half mirror according to claim 1, further including a light source which emits light of predetermined wavelengths, the light being transmittable through said protective film and said reflecting film, and said light source being provided at a side of said protective film opposite to the side at which said reflecting film is provided.

4. The half mirror according to claim 3, which is used as a rearview mirror for a vehicle.

5. The half mirror according to claim 1, further including a heating device at a side of said protective film opposite to the side at which said reflecting film is provided.

6. The half mirror according to claim 5, wherein said protective film is made of a heat-resisting material.

7. The half mirror according to claim 5, which is used as a rearview mirror for a vehicle.

8. The half mirror according to claim 1, further including a primary protective film which is interposed between said protective film and said reflecting film.

9. The half mirror according to claim 8, wherein said primary protective film comprises substantially silicon dioxide.

10. The half mirror according to claim 9, wherein the thickness of said primary protective film is in a range of 180 to 220 nm.

11. The half mirror according to claim 9, further including a light source which emits light of predetermined wavelengths, the light being transmittable through said protective film and said reflecting film, and said light source being provided at a side of said protective film opposite to the side at which said reflecting film is provided.

12. The half mirror according to claim 9, further including a heating device at a side of said protective film opposite to the side at which said reflecting film is provided.

13. A method of manufacturing a half mirror which includes a substrate that at least transmits light having predetermined wavelengths, comprising the steps of;

a) forming a reflecting film comprising substantially silicon of a thickness of 20 to 45 nm and disposing said reflecting film integrally on a surface of said substrate, for reflecting light that is made incident upon the reflecting film from the substrate side thereof and transmitting, toward said substrate side of the reflecting film at a fixed ratio, light made incident upon the reflecting film from the side opposite to the substrate side; and b) forming a protective film, which is made of a translucent material that at least transmit light having particular wavelengths and is formed on the surface of said reflecting film opposite to the surface on which said substrate is formed.

14. The method of manufacturing a half mirror according to claim 13, wherein the thickness of said protective film is greater than or equal to 1 $\mu$m.

15. The method of manufacturing a half mirror according to claim 13, further including a step of forming a primary protective film that comprises substantially silicon dioxide and interposed between said reflecting film and said protective film, said forming step being carried out directly after the forming step of said reflecting film.

16. The method of manufacturing a half mirror according to claim 15, wherein the thickness of said primary protective film is in a range of 180 to 220 nm.

17. The method of manufacturing a half mirror according to claim 15, wherein the step of forming said primary protective film is substantially the same as the process of forming said reflecting film.

\* \* \* \* \*